United States Patent [19]
Pechhold

[11] Patent Number: 6,093,775
[45] Date of Patent: Jul. 25, 2000

[54] POLYMERS WITH PENDANT FLUOROALKYLSULFIDE GROUPS

[75] Inventor: Engelbert Pechhold, Chadds Ford, Pa.

[73] Assignee: E. I. du Pont de Nemours and Company, Wilmington, Del.

[21] Appl. No.: 09/037,442

[22] Filed: Mar. 10, 1998

[51] Int. Cl.$^7$ .................................. C08F 8/18; C08F 8/34
[52] U.S. Cl. .................. 525/331.6; 525/350; 525/403
[58] Field of Search .......................... 525/331.6, 350, 525/327.3, 403

[56] References Cited

U.S. PATENT DOCUMENTS

| | | | |
|---|---|---|---|
| 2,619,508 | 11/1952 | Mikeska et al. | 260/609 |
| 3,415,902 | 12/1968 | Hickner et al. | 260/849 |
| 3,417,060 | 12/1968 | Breslow | 260/79 |
| 4,298,714 | 11/1981 | Levin et al. | 525/330 |
| 4,574,139 | 3/1986 | Sato et al. | 525/61 |
| 4,735,997 | 4/1988 | Levin et al. | 525/331.5 |
| 4,898,981 | 2/1990 | Falk et al. | 568/28 |
| 4,946,992 | 8/1990 | Falk et al. | 560/227 |
| 5,827,919 | 10/1998 | May | 524/590 |

OTHER PUBLICATIONS

J, Polymer Science, 23, 1893–1906, 1985.

Kunio Mori, Yoshior Nakamura, Modifiction of Poly(Vinyl Chloride). XVIII. The Preparation of Poly(Vinyl Chloride) Derivatives Containing Pendent Disulfide, *Polymer Letters*, vol. 9, pp. 547–550, 1971.

Takashi Iizawa, Tadatomi Nishikubo, Midori Ichikawa, Substitution and Elimination Reactions of Poly(epichlorohydrin) and Poly(2–Chloroethyl Vinyl Ether) Using Phase Transfer Catalysis *Journal of Polymer Science: Chemistry Edition*, vol. 23, pp. 1893–1906, 1985.

*Primary Examiner*—Robert Dawson
*Assistant Examiner*—D. Aylward

[57] ABSTRACT

Polymers having pendant fluoroalkylsulfide side chains and processes for their preparation by nucleophilic displacement of halides in preformed polymers using fluoroalkylthiols are disclosed which provide oil and water repellency and antisoil properties to substrates.

16 Claims, No Drawings

POLYMERS WITH PENDANT FLUOROALKYLSULFIDE GROUPS

FIELD OF THE INVENTION

This invention relates to polymers with fluoroalkyl side chains prepared by the nucleophilic displacement of halides in preformed polymeric systems using fluoroalkyl thiols.

BACKGROUND OF THE INVENTION

Certain (meth)acrylic and polyurethane polymers and oligomers containing perfluoroalkyl groups are known to provide water/oil repellency and anti-soil properties to various substrates such as concrete, paper, polymers, and fibers. Usually, these polymers or oligomers are made either by free-radical polymerization of perfluoroalkyl (meth) acrylates or by reaction of oligomeric/polymeric isocyanates with perfluoroalkyl alcohols or amines.

The compositions and molecular weights of perfluoroalkyl (meth)acrylate copolymers are limited due to their different reactivity ratios. Molecular weights of polyurethanes capped with perfluoroalkyl alcohols or amines are limited due to the monofunctionality of the available alcohols/amines. Thus the development of perfluoroalkyl substituted polymers with a wider range of properties than is provided by (meth)acrylic or polyurethane backbones is desirable. Tough and elastomeric polymers based on other monomers with fluorinated side-chains are particularly desirable, but are not provided by the (meth)acrylic or polyurethane systems.

Certain halogenated polymers have been reacted with thiols, e.g., under phase transfer catalysis conditions, to produce a polymer having pendant alkylthio ether side-chains. Perfluoroalkyl terminated neopentyl glycol compounds prepared by substitution of halogenated neopentyl glycol compounds with perfluoroalkyl thiols in the presence of base are described by Falk et al. in U.S. Pat. No. 4,898,981 and U.S. Pat. No. 4,946,992. The resulting compounds are a dimer or trimer of the starting glycol. Polymers having pendant fluoroalkylsulfide groups which retain the original properties of the polymer are desirable. The present invention provides such polymers which retain desirable elastomeric and toughness properties while also providing oil and water repellency and antisoil properties due to the fluoro-containing pendant groups.

SUMMARY OF THE INVENTION

The present invention comprises a polymer having pendant fluoroalkylsulfide groups and pendant alkylsulfide groups comprising the reaction product of:

a) a thiol of Formula I $$R_f\text{—}(A)_d\text{—}B\text{—}S\text{—}H$$

wherein:
  $R_f$ is a fully fluorinated straight or branched aliphatic radical of about 3 to about 14 carbon atoms optionally interrupted by at least one ether oxygen atom;
  A is a divalent radical selected from the group consisting of —SO$_2$N(R)—, —CON(R)—, —S—, and —SO$_2$— wherein R is H or an alkyl radical of 1 to about 6 carbon atoms;
  d is 0 or 1; and
  B is a divalent linear hydrocarbon radical —C$_n$H$_{2n}$— wherein n is from about 2 to about 12, and b) a thiol of formula II $$X\text{—}R'\text{—}S\text{—}H$$

wherein:
  X is H, OH, —COOM, and —SO$_3$M;
  M is H, Na, K, or NH$_4$;
  R' is a difunctional alkyl group selected from the group consisting of —(CH$_2$)m—, —CH(COOH)—, and —CH$_2$—CH(COOH)—; a difunctional aromatic group —C$_6$H$_4$—; or a difunctional heterocyclic group —C$_5$NH$_3$— and
  m is 1 to 18; and c) a polymer containing chlorine or bromine substituted on carbon, or a chlorinated or brominated paraffin of a maximum of 12 carbons and of a molecular weight of at least 250.

The present invention further comprises a polymer having pendant fluoroalkylsulfide groups comprising the reaction product of:

a) a thiol of Formula I $$R_f\text{—}(A)_d\text{—}B\text{—}S\text{—}H$$

wherein:
  $R_f$ is a fully fluorinated straight or branched aliphatic radical of about 3 to about 14 carbon atoms optionally interrupted by at least one ether oxygen atom;
  A is a divalent radical selected from the group consisting of —SO$_2$N(R)—, —CON(R)—, —S—, and —SO$_2$— wherein R is H or an alkyl radical of 1 to about 6 carbon atoms;
  d is 0 or 1; and
  B is a divalent linear hydrocarbon radical —C$_n$H$_{2n}$— wherein n is from about 2 to about 12, and b) a polymer containing chlorine or bromine substituted on carbon, or a chlorinated or brominated paraffin of a maximum of 12 carbons and of a molecular weight of at least 250.

The present invention further comprises a process for preparation of the above polymers by reaction of at least one thiol of Formula I, or with a thiol of Formula I and a thiol of Formula II as defined above with a chlorinated or brominated polymer or paraffin as described above in the presence of a base.

The present invention further comprises a method of improving the oil and water repellency or antisoil property of a polymer having chlorine or bromine substituted on carbon, or of a chlorinated or brominated paraffin of a maximum of 12 carbons and of a molecular weight of at least 250 comprising replacing at least 5 mole percent of chlorine or bromine with pendant fluoroalkylsulfide groups of formula:

$$R_f\text{—}(A)_d\text{—}B\text{—}S\text{—}$$

wherein:
  $R_f$ is a fully fluorinated straight or branched aliphatic radical of about 3 to about 14 carbon atoms optionally interrupted by at least one ether oxygen atom;
  A is a divalent radical selected from the group consisting of —SO$_2$N(R)—, —CON(R)—, —S—, and —SO$_2$— wherein R is H or an alkyl radical of 1 to about 6 carbon atoms;
  d is 0 or 1; and
  B is a divalent linear hydrocarbon radical —C$_n$H$_{2n}$— wherein n is from about 2 to about 12.

The present invention further comprises a method of improving the oil and water repellency or antisoil property of a substrate comprising application to a surface of the substrate an effective amount of a solution or emulsion of a polymer having pendant fluoroalkylsulfide groups and drying the substrate.

The present invention further comprises a method of improving the oil and water repellency or antisoil property of a nonfluorinated polymer or paraffin comprising melt blending or powder blending of the polymer or paraffin with a polymer having pendant fluoroalkylsulfide groups.

DETAILED DESCRIPTION OF THE INVENTION

This invention comprises new polymeric compositions comprising the reaction product of a fluorinated thiol and a preformed chloro- or bromo-substituted polymer or a chlorinated or brominated paraffin. The product is a polymer having pendant fluoroalkylsulfide groups wherein such pendant groups are of Formula I described below without the terminal hydrogen. The fluorinated thiol reactant used herein has the structure of Formula I:

$$R_f-(A)_d-B-S-H \quad \text{(Formula I)}$$

wherein:

$R_f$ is a fully fluorinated straight or branched aliphatic radical optionally interrupted by at least one oxygen atom, A is a divalent radical selected from $-SO_2N(R)-$, $-CON(R)-$, $-S-$, or $-SO_2-$, wherein R is H or an alkyl radical having 1 to 6 carbon atoms, d is zero or 1, and B is a divalent linear hydrocarbon radical $-C_nH_{2n}-$, wherein n is 2 to about 12 and preferably 2.

Preferably, $R_f$ contains at least 3 and not more than 14 carbon atoms. More preferably $R_f$ contains at least 5 and not more than 12 carbon atoms, and most preferably at least 7 and not more than 10 carbon atoms.

Representative fluorinated thiols of Formula I suitable for use herein have the structure:

$$C_mF_{(2m+1)}-CON(R)-(CH_2)_q-S-H$$

wherein:

R is H or an alkyl radical having 1 to 6 carbon atoms, m is 3 to 14, and q is 1 to 12;

$$C_mF_{(2m+1)}-SO_2N(R)-(CH_2)_q-S-H$$

wherein R, m, and q are as described above;

$$F(CF_2)_p(CH_2)_nS-H$$

wherein:

n is from about 2 to about 12, and p is 3 to 14, preferably 5 to 12, and most preferably 7 to 10;

$$(CF_3)_2CF(CF_2)_r(CH_2)_nS-H,$$

or $$(CF_3)_2CF-O-(CF_2)_r(CH_2)_nS-H$$

wherein:

n is as previously defined and r is 0 to 11, preferably 2 to 9, and most preferably 4 to 7;

$$(CF_3)_2CF-O-[CF(CF_3)CF_2-O-]_t(CH_2)_nS-H$$

wherein:

n is as previously defined and t is 0 to 5, preferably 1 to 4, and most preferably 2 to 3;

$$(CF_3)_2CF-O-[CF(CF_3)CF_2O]_uCF(CF_3)CF_2-CONH(CH_2)_2S-H$$

wherein:

n is as previously defined and u is 0 to 4, and preferably 1 to 3; and $$F(CF_2)_nCON(R)CH_2CH_2S-H,$$

or $$F(CF_2)_nSO_2N(R)CH_2CH_2S-H$$

wherein n and R are as previously defined.

The preferred highly fluorinated thiol is a member of the homologous series of perfluoroalkylethylthiols, for example perfluorohexylethylthiol or perfluorooctylethylthiol, or a mixture of such perfluoroalkylethylthiols.

Preparation of perfluoroalkyl thiols useful herein are known and many are commercially available. For example, thiols of the formula $R_f-X-SH$ have been described by Kleiner and Knell in U.S. Pat. No. 3,655,732; U.S. Pat. No. 3,884,879 and U.S. Pat. No. 4,584,143. Particularly preferred in the practice of the present invention are thiols of the formula $R_f-CH_2-CH_2-SH$, commercially available as LODYNE 921A ($C_6F_{13}-CH_2-CH_2-SH$) and LODYNE 921B ($C_8F_{17}-CH_2-CH_2-SH$) from the Ciba-Geigy Corp. (Ardsley, N.Y.).

The preformed chloro- or bromo-substituted polymer, or the chloro- or bromo-substituted paraffin, provides the backbone of the fluoroalkylsulfide substituted product of this invention. The important characteristics of the preformed chloro- or bromo-substituted polymer or paraffin are the presence of carbon atoms substituted with chlorine or bromine, solubility in the reaction solvents, and the preferred polymeric physical characteristics for a given application. The basic properties of the polymer backbone remain largely unaffected by the perfluorothiol substitution. For instance, the elastomeric properties of poly(epichlorohydrin) are retained in the fluoroalkylsulfide substituted product and such elastomeric properties are desirable for coating dimensionally unstable substrates such as wood. Similarly, the hardness and toughness of poly(vinyl chloride) are retained in the fluoroalkylsulfide substituted product, providing desirable coating properties for substrates such as stone or concrete. The perfluorothiol substitution mainly affects such surface characteristics as oil and water repellency or antisoil properties.

The bromo- or chloro-substituted polymers used as reactants in the preparation of the polymers of the present invention are chlorine- or bromine-containing homopolymers or copolymers prepared by condensation, addition, free-radical, cationic, anionic or coordination type polymerization and having a molecular weight of at least 800. The starting materials based on chloro- or bromoparaffins contain not less than 12 carbon atoms and have a molecular weight of at least 250.

The chlorine- or bromine-containing homopolymers or copolymers of alkylene or arylene monomers, epichlorohydrins, chlorinated or brominated alkyl epoxides (oxiranes), chlorinated or brominated alkyl oxetanes, chlorinated or brominated alkyl siloxanes, chlorinated or brominated polyesters, and chlorinated or brominated paraffins or polyolefins are suitable for use herein. Examples of such polymers are homo- or copolymers of vinyl chloride, vinylidene chloride, 2-chloroacrylonitrile, 2-chloroacrylic acid, 3-chloroacrylic acid, 2-chloroethyl methacrylate, 3-chloro-2-hydroxypropyl methacrylate, vinylbenzyl chloride, 2-chlorostyrene, 3-chlorostyrene, or 4-chlorostyrene, 2-chloroethyl vinyl ether, epichlorohydrin, and bis(chloromethyl)oxetane, to name only a few. Alternatively, the preformed chloro- or bromo-substituted polymer is a polyester formed from chlorinated or brominated dibasic acids or glycols, for instance 2,3-dibromosuccinic acid, or 2,3-dibromo-1,4-butanediol. Chlorinated or brominated polymers useful in this invention are also formed by chlorination or bromination of hydrocarbon polymers, such as chlorinated or brominated polyethylenes. Also useful in this invention are chlorinated or brominated paraffins having not less than 12 carbon atoms and a molecular weight of at least 250.

If desired, the resulting fluorosulfide-substituted polyether glycols from oxiranes, or oxetanes are subsequently further reacted with isocyanates to form high molecular weight polyurethanes.

Additionally, copolymers of one or more chlorinated or brominated monomers with one or more non-halogenated monomers constitute the reactant polymer, provided that the reactant polymer contains at least 0.2% by weight of halogen.

The degree of substitution of the halogen by the thiol need not be complete, and is typically in the range of 1% to 100%. The degree of substitution will preferably be high for reactant polymers of low halogen content. For reactant polymers of high halogen content, lower degrees of substitution are preferred since high substitution levels in such cases can result in a fluoroalkylsulfide-substituted polymer product with poor solubility properties. The degree of substitution is such that the fluorine content of the fluoroalkylsulfide-substituted polymer product is between 1.5% to 70%, and preferably between 5% and 50%.

Another embodiment of the present invention comprises a polymer having pendant fluoroalkylsulfide groups and pendant alkylsulfide groups which is the reaction product of a thiol of Formula I as described above, a polymer containing chlorine or bromine substituted on carbon atoms or a chlorinated or brominated paraffin as described above, and a second non-fluorinated thiol. The second thiol is an alkyl or aryl thiol of the structure of Formula II

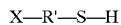   (II)

wherein:
X is —H, —OH, —CO$_2$M, or —SO$_3$M;
M is H, Na, K, or NH$_4$,
R' is a difunctional alkyl group —(CH$_2$)$_s$—, —CH(COOH)—, or —CH$_2$—CH(COOH)—; a difunctional aromatic group —C$_6$H$_4$—; or a difunctional heterocylic group —C$_5$NH$_3$—,
and s is 1 to 18.

The non-fluorinated thiol is reacted with the chlorinated or brominated polymer or paraffin simultaneously with the fluorinated thiol, or the thiols are reacted sequentially. The proportion of the non-fluorinated thiol is up to about 70 mole % of the total thiol used. Preferably the proportion of the non-fluorinated thiol is between about 5% and about 50% of the total thiol used.

Examples of such non-fluorinated thiols are octadecyl mercaptan, thiophenol, 2-mercapto pyridine, 2-mercaptoethanol, mercaptoacetic acid, mercaptosuccinic acid, or a mixture thereof.

This invention further comprises a process for the preparation of a polymer having pendant fluoroalkylsulfide groups comprising reacting the preformed chlorinated or brominated polymer or paraffin as described above and a fluorinated thiol of Formula I. The reaction is performed in the presence of a base, for instance by heterogeneous or homogeneous reactions. The base reacts with the thiol to form the thiol salt, and subsequently the thiol salt displaces the halogen in the polymer. The reaction is carried out in a suitable solvent, or in a two phase system using transfer catalysis. Typical bases are hydrides, hydroxides, or carbonates of ammonium, sodium or potassium, or alkyl amines. The preferred method of substitution is by phase transfer catalysis as described in "Phase Transfer Catalysis" by C. M. Starks, C. L. Liotta, and M. Halpern (published by Chapman & Hall, 1994, New York) by using quaternary ammonium salts or crown ethers.

Phase transfer catalysis is a technique for conducting reactions between two or more reagents in two or more phases, when the reaction would otherwise be inhibited or substantially slowed because the reactants cannot easily come together. A phase transfer agent or catalyst is added to transfer one of the reagents to a location where it can conveniently and rapidly react with another reagent. It is also necessary that the transferred species be in a highly active state when transferred; otherwise large amounts of phase transfer agent will be required. This activation function, plus the transfer function, allows phase transfer catalysis to occur with only a catalytic amount of the phase transfer agent. Phase transfer catalysis is used especially for anion transfer reactions such as the reactions involved in the present invention, requiring transfer of thiol anions from an aqueous phase into an organic phase.

An excessive stoichiometric amount of a strong base, such as an alkali metal hydroxide, should be avoided as this may cause elimination of hydrogen chloride or hydrogen bromide and result in undesirable unsaturation. An indication of the use of conditions that are too severe and are causing the occurrence of unsaturation is an increase in color of the reaction mass. Infrared spectral analysis provides a more specific method for the detection of unsaturation caused by such overly severe reaction conditions.

Suitable solvents for the reaction are ketones such as methyl isobutyl ketone (MIBK) and cyclohexanone, aromatics such as toluene, and ethers such as tetrahydrofuran. In certain cases, for instance where a reactant polymer with a high halogen content is subjected to a high degree of substitution with the fluorothiol, the solubility of the heavily fluorosulfide-substituted polymer product in conventional solvents may be inadequate and a fluorinated solvent such a hexafluorobenzene is necessary to dissolve the product polymer for facile removal of base and subsequent application to the substrate.

For example, the displacement of chlorine or bromine in preformed halogenated polymers or halogenated paraffins by perfluoroalkylethyl thiols is carried out at elevated temperature in MIBK with potassium carbonate as a heterogeneous system. In the case of MIBK, the temperature is 65° C. to 105° C. The relatively slow reaction in the heterogeneous system occurs over 24 to 48 hours. The reaction progress is followed by gas chromatography. Preferably, the reaction is hastened by the use of transfer catalysts. Examples of such salts are benzyltriethylammonium or tetrabutylammonium chloride or bromide. Higher temperatures are used under pressure or with other solvents, but an excessive temperature should be avoided as this also may cause elimination of hydrogen chloride or hydrogen bromide and result in undesirable unsaturation. As was the case for the occurrence of unsaturation due to excessive strong base above, color development and infrared spectral analysis provide techniques for detecting overly drastic reaction conditions. Overly severe reaction conditions resulting in elimination reactions and unsaturation become of greater concern when the degree of chlorination or bromination of the starter polymer is high.

The present invention further comprises a process for the preparation of a polymer having pendant fluoroalkylsulfide groups and pendant alkylsulfide groups comprising reacting a polymer having chlorine or bromine substituted on carbon atoms, or a chlorinated or brominated paraffin of a maximum of 12 carbon atoms having a molecular weight of at least 250, with a fluorinated thiol of Formula I as described above and a non-fluorinated thiol of Formula II as described above in the presence of a base. The two thiols are reacted simultaneously or sequentially. The reaction conditions, suitable bases, suitable catalysts, suitable solvents, and amounts of reactants are as described above for the corresponding reaction with a single thiol.

In either displacement method, the resulting product is isolated by stripping of the filtered or centrifuged solution or directly by pouring into aqueous methanol. Before characterizing by elementary analysis the product is sometimes recrystallized from ketones and dried in a vacuum oven at 80° C. to 90° C. at 10 Pa to 30 Pa.

The present invention further comprises a method of improving the oil and water repellency or antisoil property of a polymer having chlorine or bromine substituted on carbon, or of a chlorinated or brominated paraffin of a maximum of 12 carbons and of a molecular weight of at least 250 comprising replacing at least 5 mole percent of the chlorine or bromine with pendant fluoroalkylsulfide groups of formula:

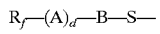

wherein:

$R_f$ is a fully fluorinated straight or branched aliphatic radical of about 3 to about 14 carbon atoms optionally interrupted by at least one ether oxygen atom;

A is a divalent radical selected from the group consisting of —$SO_2N(R)$—, —$CON(R)$—, —S—, and —$SO_2$— wherein R is H or an alkyl radical of 1 to about 6 carbon atoms;

d is 0 or 1; and

B is a divalent linear hydrocarbon radical —$C_nH_{2n}$— wherein n is from about 2 to about 12.

The replacement is conducted using the above-described processes of the present invention. The degree of substitution can range up to 100%. The degree of substitution is such that the fluorine content of the fluoroalkylsulfide-substituted polymer product is between 1.5% to 70%.

This invention further comprises a method for the enhancement of the oil and water repellency and antisoil properties of polymers or paraffins, in particular nonfluorinated polymers or paraffins, by the melt or powder blending of the fluorosulfide-substituted polymers of this invention with such non-fluorinated polymers or paraffins. The non-fluorinated polymer or paraffin is either the corresponding unsubstituted polymer or paraffin or a distinct non-fluorinated polymer or paraffin. Suitable non-fluorinated polymers include thermoplastic polymers or elastomers including polyalkylenes such as polyethylene, polypropylene or polyisobutylene; polyacetals; polystyrene; polyacrylates; polymethacrylates; polyesters; polyamides such as nylon 6 or nylon 66; or polybutadiene. The blend is then conventionally spun, extruded, or blown into fibers, films, or shaped plastic parts with enhanced oil and water repellency and antisoil properties. The techniques for melt blending, spinning, extrusion, blowing, and molding are well known in the art. Powder-blended compositions are also useful to spray or coat objects followed by a heat fusion step, again conferring the enhanced oil and water repellency and antisoil properties to the coated object.

For instance, in the former case, 1H,1H,2H,2H-perfluorodecanesulfide substituted poly(vinyl chloride) is melt blended with poly(vinyl chloride) to give a melt blend with enhanced oil and water repellency. An important factor in the selection of the second unsubstituted polymer is its degree of compatibility or mutual miscibility with the fluorosulfide-substituted polymer. High compatibility provides a more uniform composition and oil and water repellency throughout the blend, an advantage if the extrudate is to be machined, cut, or abraded. Lower compatibility results in "blooming" of the fluorosulfide groups to the surface, enhancing the utilization of the oil and water repellency properties.

The ratio of fluorosulfide-substituted polymer to non-fluorinated polymer is selected to provide a blend having a fluorine content between 0.5% to 70% and preferably between 1.5% and 30%.

This invention further comprises a method for the enhancement of the oil and water repellency and antisoil property of substrates by the surface application of the fluorosulfide-substituted polymers of the invention followed by drying. Such application is by means of spraying, brushing, dipping, extrusion or other conventional techniques.

The perfluorosubstituted polymers of the prior art, based on polymerization of perfluoroalkylethyl (meth)acrylate monomers, limit usable comonomers to monomers having reactivities comparable to the fluorinated (meth)acrylates. The molecular weight of the polymers that can be prepared from perfluoroalkylethyl (meth)acrylates is also often limited. In contrast, the process of this invention allows the incorporation of fluoroalkylsulfide-groups onto any chlorine- or bromine-containing polymer or elastomer such as poly(vinyl chloride), poly(epichlorohydrin), poly(2-chloroethyl vinyl ether), poly[bis(chloromethyl)oxetane], poly(4-chlorostyrene), poly[(chloropropyl)methyl-dimethyl siloxane], and others. Any desired degree of substitution up to 100% of the chlorine or bromine is possible. The chlorine or bromine is substituted by fluoroalkylsulfide groups giving rise to polymers containing up to 70% of fluorine.

For instance, a deficiency with the polyperfluoroalkylethyl (meth)acrylate polymers is that they give soft to brittle finishes. By choosing the type and molecular weight of the reactant polymer, the fluorosulfide-substituted product polymers of the present invention are variously tough, hard, or elastomeric. Such properties are unavailable in copolymers using fluorinated (meth)acrylates. Additionally, fluorinated (meth)acrylates are prepared by free radical polymerization. The fluorosulfide-substituted polymer products of this invention are based on a wider range of polymer backbones, such as polyethylene, polystyrene, or poly(epichlorohydrin).

Another advantage of the substituted polymers and copolymers of the present invention is that, unlike polyurethanes capped with perfluoroalkyl alcohols or amines, they are typically soluble in common solvents, including ketones and esters. The evaporation of such solutions result in tough or elastomeric coatings or finishes, thus providing a broader range of properties for such coatings and finishes for carpets, textiles and construction materials. In some cases, where the degree of perfluorothiol substitution is high, a fluorinated cosolvent such as hexafluorobenzene is required to provide complete solution.

The fluorosulfide substituted products of this invention are applied directly to substrates. For instance, the products are applied by preparing a solution or aqueous dispersion of the fluorosulfide substituted product which is then applied to the substrate by padding, coating, dipping, spraying and other conventional methods. The dry weight of the fluorosulfide substituted product, or the fluorine concentration in a dried fabric, are conventionally controlled by the concentration and volume of the solution or dispersion applied. Suitable application solvents are ketones, aromatic solvents, and ethers, including the solvents used for the reaction medium. Aqueous dispersions of the fluorosulfide substituted product are also made conventionally, using either anionic or cationic surfactants.

The fluorosulfide substituted polymers of the present invention are useful to provide oil and water repellency and anti-soil properties to a wide variety of substrates such as natural or synthetic fabrics and fibers, concrete, glass, stone, metals, wood, paper, leather, polymers, and polymeric films. Suitable fabrics and fibers include polyamides such as nylon, polyesters, wool, silk, and cotton.

TEST METHODS

The following test methods were used in the Examples detailed hereinafter.

Test Method 1—Contact Angle Measurement

Clean microscopic glass slides were dipped into dilute polymer solutions and allowed to air-dry for 24 hours. The advancing and receding contact angles were then measured at 23° C.

Test Method 2—Oil Repellency: Hydrocarbon Resistance Test

The oil repellency was measured according to AATCC Test Method 118-1992. This test method detects the presence of a fluorochemical finish, or other compounds capable of imparting a low energy surface, on all types of substrates by evaluating the substrate's resistance to wetting by a selected series of liquid hydrocarbons of different surface tensions. A rating scale of 0–8 is employed, with the rating of 8 being given to the least oil penetrating (most oil repellent) surface.

Test Method 3—Motor Oil Stain Test

Staining of stones by motor oil was measured by leaving a few drops of Pennzoil Motor Oil for 1 minute on the stone surface. The excess oil was then blotted off and possible staining recorded.

Test Method 4—Water Repellency Test

The water repellency was measured according to DuPont Teflon® Wilmington, Del.) Standard Test Method No. 311.56, widely used in the industry for testing fabrics and other substrates. The specimen is placed on a flat level surface. Three drops of the selected water/isopropanol mixture is placed on the surface and left for 10 seconds. If no penetration has occurred, the specimen is judged to "pass" this level of repellency and the next higher numbered test liquid is tested. The substrate rating is the highest numbered test liquid that does not wet the substrate. A rating of 0 indicates no water repellency, a rating of 8 indicates maximum water repellency.

The water/isopropanol mixtures have the following compositions:

| Repellency Rating Number | Composition (wt %) | |
|---|---|---|
| | Water | Isopropanol |
| 0 | — | — |
| 1 | 98 | 2 |
| 2 | 95 | 5 |
| 3 | 90 | 10 |
| 4 | 80 | 20 |
| 5 | 70 | 30 |
| 6 | 60 | 40 |
| 7 | 50 | 50 |
| 8 | 40 | 60 |

Test Method 5—Water Absorption of Concrete Patio Blocks

The water absorption was measured according to Federal Specification Test SS-W-110C for water-repellent, colorless, silicon resin base. The substrate used was concrete patio blocks.

Test Method 6—Anti-Swelling Effectiveness of Water-Repellent Formulations and Differential Swelling of Untreated Wood when exposed to Liquid Water Environment The ASTM Method D 4446-84 was employed to measure the effectiveness of water-repellent preservative formulations for retarding dimensional changes in wood submerged in water. A minimum water-repellent efficiency of 60% is required to pass this test method. The higher the % efficiency, the more effective is the repellency.

Materials

The following materials were employed in the examples.

LODYNE 921A and LODYNE 921B are perfluorohexylethylthiol (1H,1H,2H,2H-tridecafluorooctane-1-thiol) and perfluorooctylethylthiol (1H,1H,2H,2H-heptadecafluorodecane-1-thiol), respectively, and were obtained from Ciba-Geigy Corp. (Ardsley, N.Y.).

Polymers were obtained from Dover Chemical Corp., Dover, Ohio ("Paroil"); DuPont Dow Elastomers, Wilmington, Del. ("Tyrin"); and Zeon Chemicals, Inc., Rolling Meadows, Ill. ("Hydrin"). Other polymers were obtained from Polyscience, Inc., Warrington, Ohio and Scientific Polymer Products, Ontario, N.Y.

All other chemicals were obtained by Aldrich Chemical Co. (Milwaukee, Wis.) unless noted otherwise.

EXAMPLES

Examples 1–3 and 12–16 describe various process conditions (heterogeneous, homogeneous, and phase transfer catalyzed) for replacing chlorine in poly(vinyl chloride) by perfluoroalkylsulfides. Examples 4 and 11 describe replacements in copolymers of vinyl chloride. Examples 5–10 and 19–25 describe reactions with chlorinated polymers other than poly(vinyl chloride). Example 26 describes the reaction with a brominated oligomeric ester. Examples 17 and 18 describe the use of other thiols in addition to perfluoroalkylthiols for replacing chlorine in poly(vinyl chloride). Examples 27–31 describe application of the fluorosulfide-substituted polymers onto various substrates.

Example 1

Poly(vinyl chloride) (6.2 g) of inherent viscosity 0.55 and containing 57.4% of chlorine was dissolved under agitation at 105° C. in 80 g of methyl isobutyl ketone. To the clear solution was added 24 g (0.05 mole) of 1H,1H,2H,2H-perfluorodecanethiol and 6.9 g (0.05 mole) of anhydrous potassium carbonate. The reaction mixture was cooled to

Example 2

Poly(vinyl chloride) (9.3 g) of inherent viscosity 0.55 and containing 57.4% of chlorine was dissolved under agitation at 90° C. in 100 g of methyl isobutyl ketone. To the clear solution was added 24 g (0.05 mole) of 1H,1H,2H,2H-perfluorodecanethiol and 6.9 g (0.05 mole) of anhydrous potassium carbonate. The reaction mixture was cooled to room temperature after heating for 3 days at 105° C. and centrifuged to separate the solids. The clear yellow solution was then poured into a blender containing 250 g of methanol. The precipitated polymer was collected and dried in a vacuum oven at 80° C. The brownish polymer contained 43.3% of fluorine.

Example 3

Poly(vinyl chloride) (6.2 g) of inherent viscosity 1.20 and containing 55.9% of chlorine was dissolved under agitation at 95° C. in 80 g of methyl isobutyl ketone. To the clear solution was added 12 g (0.025 mole) of 1H,1H,2H,2H-perfluorodecanethiol, 5.06 g (0.025 mole) of 1-dodecanethiol and 6.9 g (0.05 mole) of anhydrous potassium carbonate. The reaction mixture was cooled to room temperature after heating for 2½ days at 105° C. and centrifuged to separate the solids. The clear yellow solution was then poured into a blender containing 250 g of methanol. The precipitated polymer was collected and dried in a vacuum oven at 80° C. The yellow tough polymer contained 10.90% chlorine and 46.3% fluorine.

Example 4

Carboxylated poly(vinyl chloride) (5.0 g), having a carboxyl content of 1.8% and containing 53.8% of chlorine, was dissolved at 95° C. under agitation in 80 g of methyl isobutyl ketone. To the solution was added 12.8 g (0.0337 mole) of 1H,1H,2H,2H-perfluorooctanethiol and 4.65 g (0.0337 mole) of anhydrous potassium carbonate. After heating for 2 days at 105° C. the product was separated from the solids by centrifugation and poured into 250 ml of methanol which caused precipitation of the polymer. The polymer was collected by filtration and air-dried to amber solid containing 15.58% chlorine and 40.6% fluorine.

Example 5

A poly(epichlorohydrin) elastomer (5.0 g) with a density of 1.36 and containing 37.4% of chlorine was dissolved under agitation at 80° C. in 80 g of methyl isobutyl ketone. To the clear solution was added 25.9 g (0.054 mole) of 1H,1H,2H,2H-perfluorodecanethiol and 7.46 g (0.054 mole) of anhydrous potassium carbonate. A two-phase liquid product formed after heating for 4 days at 105° C. The two phases became homogeneous after addition of 50 g of hexafluorobenzene at 70° C. The reaction product was then separated from the solids by centrifugation and the clear solution poured into a blender containing 250 g of methanol. The resulting polymer was isolated by filtration and dried in a vacuum oven at 80° C. and give a tough elastomer containing 4.3% chlorine and 50.2% fluorine. The product was soluble in a mixture of hexafluorobenzene and methyl isobutyl ketone.

Example 6

2-Chloroethyl vinyl ether (42.4 g, 0.4 mole) was dissolved in 150 ml of toluene. The solution was cooled to −60° C. in a dry-ice/methanol bath and a solution of 1 g of boron trifluoride etherate in 5 ml of toluene was slowly added under agitation over a 20 minute period. At some point an exotherm occurred raising the temperature to 0° C. The reaction mixture was agitated for another hour at −60° C., before allowing the temperature to rise to 25° C. The solution was poured into 300 ml of methanol after the addition of 4 drops of diethanolamine. The resulting yellowish polymer was dissolved in 100 g of methyl isobutyl ketone, washed twice with deionized water and finally stripped to dryness at 80° C. to 90° C. under vacuum (10 Pa to 20 Pa) to give a tacky, yellow polymer. The poly (2-chloroethyl vinyl ether) contained 32.0% of chlorine and had a number average molecular weight Mn of 20,100 at a Mw/Mn ratio of 1.93 by gel permeation chromatography in tetrahydrofuran.

Poly(2-chloroethyl vinyl ether) (12.1 g) was dissolved in 80 g of methyl isobutyl ketone. To the solution was added under agitation 24.0 g (0.05 mole) of 1H,1H,2H,2H-perfluorodecanethiol and 6.9 g (0.05 mole) of anhydrous potassium carbonate before heating to 105° C. for about 2 days. The reaction product was cooled to room temperature, separated from the solids by centrifugation, and stripped to dryness at 80° C. to 90° C. under reduced pressure to give an amber brittle polymer containing 1.19% chlorine and 55.6% fluorine.

Example 7

Bis(chloromethyl)oxetane (20 g, 0.13 mole) was dissolved in 100 ml of toluene. To the agitated solution was added 0.5 g of boron trifluoride etherate in 2 g of toluene and the solution was slowly heated to 95° C. A white solid began to form. After heating for 5 hours at 95° C., the solids were filtered, washed once with acetone and air-dried. The poly [bis(chloromethyl)oxetane] melted between 147° C. to 160° C., contained 44.9% chlorine, had a number average molecular weight Mn=2,640, and a ratio Mw/Mn of 1.62 by gel permeation chromatography.

Poly[bis(chloromethyl)oxetane] (5 g) was dissolved under agitation at 90° C. in 90 g of methyl isobutyl ketone. To the solution was added 31.2 g of 1H,1H,2H,2H-perfluorodecanethiol (0.065 mole) and 9.0 g of anhydrous potassium carbonate (0.065 mole). The reactants were heated under agitation for 2 days. The product was then cooled, separated from the solids by centrifugation, and poured into 250 ml of methanol. The resulting amber powder was collected and air-dried, melting at 53° C. to 62° C. and containing 5.2% chlorine and 54.9% fluorine.

Example 8

Poly(4-chlorostyrene) (4.5 g) containing 25.05% of chlorine was dissolved in 35 g of toluene. To the solution was added at 90° C. under agitation 15.6 g (0.0326 mole) of 1H,1H,2H,2H-perfluorodecanethiol in 23 g of methyl isobutyl ketone and 4.5 g (0.0326 mole) of anhydrous potassium carbonate. After heating for 1½ days the product was separated from the solids by centrifugation, precipitated in 150 ml of methanol, collected by filtration and air-dried and gave a tan polymer melting at 137° C. to 145° C., containing 6.09% chlorine and 38.4% fluorine.

Example 9

Dimethyl(84% to 86%)-(chloropropyl)methyl(14–16%)-siloxane copolymer (41.6 g) from United Chemical Technologies, Inc. (Bristol, Pa.), containing 6.45% of chlorine was dissolved in 50 g of methyl isobutyl ketone. To the agitated solution was added at 90° C. 36 g (0.075 mole) of 1H,1H,2H,2H-perfluorodecanethiol and 10.4 g (0.075 mole) of anhydrous potassium carbonate. The reaction product was cooled to room temperature after 2 days, separated from the solids by centrifugation and poured into 150 ml of methanol. The heavier oily layer was separated and dried under vacuum (10 Pa to 15 Pa) at 80° C. to 90° C. and gave a yellow, viscous oil containing 2.28% chlorine and 21.1% fluorine.

The contact angle was measured for Examples 1–9 and are shown in Table 1 below. In each case, the results showed higher contact angles for the fluorine-containing polymers of the present invention.

TABLE 1

Contact Angle Measurements (Degrees)

| Polymer | Water | | Hexadecane | |
|---|---|---|---|---|
| | Advancing | Receding | Advancing | Receding |
| Poly(vinyl chloride)* | 87 | 77 | 20 | 0 |
| Example 1 | 122 | 96 | 81 | 79 |
| Example 2 | 122 | 113 | 78 | 76 |
| Example 3 | 123 | 96 | 80 | 77 |
| Poly(vinyl chloride), carboxylated* | 82 | 57 | 12 | 0 |
| Example 4 | 121 | 82 | 77 | 65 |
| Poly(epichlorohydrin), Elastomer* | 95 | 53 | 21 | 0 |
| Example 5 | 23 | 97 | 81 | 78 |
| Poly(2-chloroethyl vinyl ether)* | 86 | 0 | 15 | 0 |
| Example 6 | 122 | 102 | 83 | 77 |
| Poly[bis(chloromethyl)oxetane]* | 31 | 0 | 7 | 0 |
| Example 7 | 126 | 101 | 82 | 44 |
| Poly(4-chlorostyrene)* | 95 | 83 | 7 | 0 |
| Example 8 | 124 | 108 | 80 | 42 |
| Poly[dimethyl(84–86%)-(chloropropyl)methyl(14–16%)siloxane]* Not applicable, reactant polymer itself is liquid | | | | |
| Example 9 | 91 | 58 | 29 | 4 |

*In each set, this is the reactant polymer without fluorothiol substitution, and acts as the control for the set.

Example 10

Polychloroprene (5.0 g) with a density of 1.23 and containing 37.8% of chlorine was dissolved at 80° C. in 80 g of methyl isobutyl ketone. To the slightly hazy solution was added under agitation 21.6 g (0.057 mole) of 1H,1H,2H,2H-perfluorooctanethiol and 7.85 g (0.057 mole) of anhydrous potassium carbonate. The heterogeneous reaction mixture was held for 2½ days at 90° C. The solids were then separated by centrifugation at room temperature and the solvent and unreacted thiol removed at 90° C. under vacuum (5 Pa to 10 Pa) and gave a dark-brown rubbery polymer containing 9.3% chlorine and 43.7% fluorine.

Example 11

Poly(vinylidene chloride-co-vinyl chloride) (5.0 g) with a density of 1.690 and containing 58.9% of chlorine was dissolved at 105° C. in a mixture of 100 g of toluene and 40 g of methyl isobutyl ketone. To the hazy solution was added under agitation 12.8 g (0.0337 mole) of 1H,1H,2H,2H-perfluorooctanethiol and 4.65 g (0.0337 mole) of anhydrous potassium carbonate. The heterogeneous reaction mixture was held under agitation for 2 days at 105° C. The solids were then separated by centrifugation at room temperature and the solvent and unreacted thiol removed at 90° C. under vacuum (5 Pa to 10 Pa) and gave a dark-brown polymer containing 29.0% chlorine and 26.5% fluorine.

Example 12

1H,1H,2H,2H-Perfluorodecanethiol (12.0 g, 0.025 mole) was dissolved in 30 g of dry methyl isobutyl ketone. To the agitated solution under nitrogen was added at room temperature 1.1 g (0.0275 mole) of 60% sodium hydride and after half hour a solution of 9.3 g of poly(vinyl chloride) in 70 g of dry methyl isobutyl ketone. The reactants were then heated under agitation at 80° C. The reaction mass which turned yellow at first and later greenish brown was held for 32 hours at 80° C. before being poured into 200 g of methanol containing 10 g of water. A yellow solid polymer separated which was dried in a vacuum oven at 80° C. to 90° C. and contained 34.3% of fluorine.

Example 13

Poly(vinyl chloride) (9.3 g) of inherent viscosity 0.55 was dissolved in 100 g of tetrahydrofuran. To the agitated liquid under nitrogen was added 12.0 g (0.025 mole) of 1H,1H,2H,2H-perfluorodecanethiol and a solution of 1.4 g (0.025 mole) of potassium hydroxide and 0.02 g of tetrabutylammonium bromide in 3.6 ml of deionized water. The reactants were held under agitation for 1 day at 60° C. A white solid separated over time. The reaction mass was then poured into 250 g of methanol and 10 g of water. The resulting solid was collected and dried in a vacuum oven at 80° C. to 90° C. and gave a yellowish polymer containing 28.7% fluorine.

Example 14

Poly(vinyl chloride) (9.3 g) of inherent viscosity 0.55 was dissolved under agitation at 90° C. in 100 g of cyclohexanone. To the agitated liquid was added 12.0 g (0.025 mole) of 1H,1H,2H,2H-perfluorodecanethiol and a solution of 3.5 g (0.025 mole) of anhydrous potassium carbonate and 0.05 g of tetrabutylammonium bromide in 28 g of deionized water. The reactants were held under agitation for 2 days at 90° C. The reaction mass was then poured into a blender containing 250 g of methanol and 10 g of water. A yellow polymer separated which was dried in a vacuum oven at 80° C. to 90° C. The polymer contained 34.8% fluorine.

Example 15

Poly(vinyl chloride) (9.3 g) of inherent viscosity 0.55 was dissolved under agitation at 90° C. in 100 g of methyl isobutyl ketone. The solution was cooled to 60° C. before the addition of 12.0 g (0.025 mole) of 1H,1H,2H,2H-perfluorodecanethiol, 20 g of isopropanol and a solution of 1 g (0.025 mole) of sodium hydroxide in 5 ml of deionized water. The reactants were held under agitation for 2 days at 60° C. The reaction mass was then poured into 250 g of methanol and gave rise to a yellowish polymer which was dried in a vacuum oven at 80° C. to 90° C. The polymer contained 31.0% fluorine.

Example 16

Poly(vinyl chloride) (9.3 g) of inherent viscosity 0.55 was dissolved under agitation at 80° C. in 100 g of methyl isobutyl ketone. To the solution was then added 12.0 g (0.025 mole) of 1H,1H,2H,2H-perfluorodecanethiol and a solution of 3.45 g (0.025 mole) of anhydrous potassium carbonate and 0.3 g of tetrabutylammonium bromide in 14 ml of deionized water. The reactants were heated under agitation for 20 hours at 90° C. before being poured into 200 g of methanol and 10 g of water. A solid separated which was collected and dried in a vacuum oven at 80° C. to 90° C. and gave rise to a yellowish polymer containing 35.4% fluorine.

Example 17

Poly(vinyl chloride) (9.3 g) of inherent viscosity 0.55 was dissolved under agitation at 80° C. in 100 g of methyl isobutyl ketone. To the solution was then added 6.0 g (0.0125 mole) of 1H,1H,2H,2H-perfluorodecanethiol, 3.6 g (0.0125 mole) of n-octadecyl mercaptan and a solution of 3.45 g (0.025 mole) of anhydrous potassium carbonate and 0.03 g of tetrabutylammoniumn bromide in 14 ml of deionized water. The reactants were heated under agitation for 15 hours at 90° C. before being poured into 200 g of methanol and 10 g of water. A solid separated which was collected and dried in a vacuum oven at 80° C. to 90° C. and gave rise to a yellowish polymer containing 27.8% chlorine, 21.8% fluorine and 3.7% sulfur. This indicated that approximately 5.6 g of 1H,1H,2H,2H-perfluorodecanethiol and 2.4 g of n-octadecyl mercaptan were incorporated into the polymer.

Example 18

Poly(vinyl chloride) (9.3 g) of inherent viscosity 0.55 was dissolved under agitation at 80° C. in 100 g of methyl isobutyl ketone. To the solution was then added 6.0 g (0.0125 mole) of 1H,1H,2H,2H-perfluorodecanethiol, 1.15 g (0.0125 mole) of mercaptoacetic acid and a solution of 5.2 g (0.0376 mole) of anhydrous potassium carbonate and 0.03 g of tetrabutylammonium bromide in 15.6 ml of deionized water. The reactants were heated under agitation for 18 hours at 90° C. before being poured into 200 g of methanol and 10 g of water. A solid separated which was collected and dried in a vacuum oven at 80° C. to 90° C. giving rise to a yellowish polymer containing 27.6% chlorine, 24.8% fluorine and 5.0% sulfur. This indicated that approximately 6.0 g of 1H,1H,2H,2H-perfluorodecanethiol and 1.0 g of mercaptoacetic acid were incorporated into the polymer.

Example 19

To a solution of 49.25 g (0.535 mole) of epichlorohydrin and 0.143 g (0.0023 mole) of ethylene glycol in 58.6 g of toluene was slowly added under agitation at 50° C. by means of a syringe a solution of 0.6 g of boron trifluoride etherate in 5 g of toluene over a 15 minute period. After agitating the reactants for 2 hours, a sample analyzed by gas chromatography indicated less than 0.1% residual epichlorohydrin monomer. All volatiles were then removed on a rotary evaporator at 90° C. and a pressure of 5 Pa and gave rise to a brownish very viscous liquid containing 36.4% of chlorine. The number average molecular weight by hydroxyl number determination was 2474.

The above epichlorohydrin oligomer (6.04 g, 0.0656 mole) was dissolved in 72 g of methyl isobutyl ketone. To the agitated solution at 105° C. was then added 24.9 g (0.0655 mole) of 1H,1H,2H,2H-perfluorooctanethiol and 9.05 g (0.0655 mole) of anhydrous potassium carbonate. The reactants were held under agitation at 105° C. for 28 hours. All the volatiles were then removed under reduced pressure after separation of the solids by centrifugation resulting in a brownish very viscous liquid containing 1.8% chlorine and 53.6% fluorine.

Example 20

"Paroil" 140 (12.0 g), a chlorinated paraffin containing 43% of chlorine and having a viscosity of 149 Saybolt universal seconds at 210° F. ($31.45 \times 10^{-6}$ m$^2$/s at 99° C.) was dissolved at 90° C. in 150 g of methyl isobutyl ketone. To the agitated solution was added 20.9 g (0.0436 mole) 1H,1H,2H,2H-perfluorooctanethiol and a solution of 6.0 g (0.0436 mole) of anhydrous potassium carbonate and 0.04 g of tetrabutylammonium bromide in 7 g of deionized water. The reactants were held under agitation at 90° C. for 44 hours. The volatile materials were then stripped at 85° C. under reduced pressure (2 Pa to 5 Pa) and gave a clear brownish viscous liquid which became a waxy material at room temperature containing 51.6% fluorine and 13.7% chlorine.

Example 21

Solid chloroparaffin (10.0 g) of approximate molecular weight of 1000 and containing 70% of chlorine was dissolved at 50° C. in 100 g of methyl isobutyl ketone. To the solution was then added 48.0 g (0.1 mole) of 1H,1H,2H, 2H-perfluorodecanethiol and a solution of 13.8 g (0.1 mole) of anhydrous potassium carbonate and 0.03 g of tetrabutylammonium bromide in 35 g of deionized water. The reactants were held under agitation for 24 hours at 90° C. During this time the solution became very dark-brown. After cooling to room temperature, the solution was poured into a blender containing 200 ml of methanol and 10 ml of deionized water. The precipitate was collected by filtration and after drying resulted in a dark-brown solid melting at 55° C. to 60° C. and containing 55.0% of fluorine.

Example 22

"Paroil" 140 (10.0 g), chlorinated paraffin as described in Example 20, was dissolved in 100 g of methyl isobutyl ketone. To the agitated solution was added 10.6 g (0.023 mole) of 1H,1H,2H,2H-perfluorooctanethiol, 0.7 g (0.009 mole) 2-mercaptoethanol and a solution of 4.4 g (0.032 mole) of anhydrous potassium carbonate and 0.04 g of tetrabutylammonium bromide in 7 g of deionized water. The reactants were held under agitation at 90° C. After 20 hours none of the mercaptans were detected by gas chromatography. All volatiles were then stripped from the product at 85° C. to 90° C. under vacuum (2 Pa to 5 Pa) and gave rise to a brownish waxy material containing 31.8% of fluorine.

Example 23

"Hydrin" C-2000 (10.8 g), an epichlorohydrin/ethylene oxide elastomer containing 25.27% of chlorine, was dissolved at 90° C. in 150 ml of methyl isobutyl ketone. To the polymer solution was added 18.5 g (0.038 mole) of 1H,1H, 2H,2H-perfluoro-octanethiol and a solution of 5.3 g (0.038 mole) of anhydrous potassium carbonate and 0.034 g of tetrabutylammonium bromide in 7 g of deionized water. The reactants were held under agitation for 20 hours at 90° C. before being poured into 200 ml of methanol. A yellowish elastomer separated which was dried in a vacuum oven at 80° C. to 90° C. containing 41.5% of fluorine and 5.0% of chlorine.

Example 24

"Tyrin" 3611P (10.0 g), a chlorinated polyethylene elastomer containing approximately 36% of chlorine and having a melt viscosity of about 8,000 poise, was dissolved at 90° C. in 100 g of methyl isobutyl ketone. To the slightly hazy solution was added 24.0 g (0.05 mole) of 1H,1H,2H,2H-perfluorooctanethiol and a solution of 6.9 g (0.05 mole) of anhydrous potassium carbonate and 0.04 g of tetrabutylammonium bromide in 13 g of deionized water. The reactants were held under agitation for 44 hours at 90° C. After cooling to 60° C., the product was poured into a water containing 200 ml of methanol and 10 ml of deionized water. The polymeric material which separated was dried in a vacuum oven at 80° C. to 90° C. and gave a yellowish elastomer containing 11.1% of chlorine and 34.6% of fluorine.

Example 25

A solution of 10.4 g (0.1 mole) of styrene, 15.3 g (0.1 mole) of 4-vinylbenzyl chloride and 1.1 g of t-butyl peroxide in 20 ml of xylene was slowly added to 70 g of agitated xylene at 133° C. to 135° C. over a 2-hour period. The reactants were held under agitation at 135° C. for a 20-hour period. The reaction product was then poured into 300 ml of methanol. A solid separated which was dried in a vacuum oven at 80° C. to 90° C. and gave an amber, brittle resin, melting at 80° C. to 87° C., containing 11.1% of chlorine and having a number average molecular weight of 7,135 by gel permeation chromatography.

The above copolymer (15.0 g) of styrene/4-vinylbenzyl chloride was dissolved at 90° C. in 100 g of methyl isobutyl ketone. To the agitated solution was added 13.0 g (0.027 mole) of 1H,1H,2H,2H-perfluorooctanethiol and a solution of 3.7 g (0.027 mole) of anhydrous potassium carbonate and 0.04 g of tetrabutylammonium bromide in 7 g of deionized water. The reactants were held under agitation at 90° C. for 20 hours before being poured into 200 ml of methanol. A solid separated which was dried in a vacuum oven at 80° C. to 90° C. and gave an amber, brittle resin melting at 92° C. to 100° C. and containing 2.6% of chlorine and 32.4% of fluorine.

Example 26

An oligomeric polyester glycol was prepared by reacting 48.5 g (0.25 mole) of dimethyl terephthalate, 31.0 g (0.25 mole) of 2,3-dibromo-1,4-butanediol and 14.6 g (0.163 mole) of 1,4-butanediol at 150° C. to 160° C. in the presence of 3 drops of tetraisopropyl titanate available as TYZOR TPT from E.I. du Pont de Nemours and Company, Wilmington, Del. The crude product was recrystallized from acetone and gave a white powder melting a 118° C. to 126° C., containing 8.5% of bromine and having a number average molecular weight of 727 by gel permeation chromatography (GPC) in tetrahydrofuran.

The above oligomeric ester (4.1 g) was dissolved in 30 g of methyl isobutyl ketone and heated under agitation at 65° C. before the addition of 0.2 g (0.5 mole) of 1H,1H,2H,2H-perfluorooctanethiol and 0.07 g (0.5 mole) of anhydrous potassium carbonate. After heating for 24 hours at 65° C., the warm solution was filtered and all the volatiles removed on a rotary evaporator at 110° C. and a pressure of 2 Pa to 5 Pa and gave a white solid containing 1.4% of fluorine.

Example 27

Solutions of Examples 5 and 16 in acetone were applied onto 4 different upholstery fabrics by padding an amount sufficient to provide the fluorine concentration on the dried carpet as shown in Table 2:

cotton: fabric weight: 7.4 oz/yd$^2$ (0.25 kg/m$^2$), white
nylon: fabric weight: 9.6 oz/yd$^2$ (0.33 kg/m$^2$), tan
polyester: fabric weight: 9.5 oz/yd$^2$ (0.32 kg/m$^2$), tan
polypropylene: fabric weight: 7.5 oz/yd$^2$ (0.25 kg/m$^2$), printed The oil/water repellencies and the fluorine loadings were measured after drying at ambient temperature for 1 day according to Test Methods 2 and 4 respectively and are shown in Table 2 below.

TABLE 2

Fluorine Loadings and Oil and Water Repellency Measurements on Fabrics (Ambient Temperature Drying).

| Upholstery Fabric Type | Control Repellency | | Example 5 | | | Example 16 | | |
|---|---|---|---|---|---|---|---|---|
| | Oil | Water | Fluorine (ppm) | Repellency Oil | Water | Fluorine (ppm) | Repellency Oil | Water |
| Cotton | 0 | 0 | 730 | 4 | 8 | 540 | 2 | 5 |
| Nylon | 0 | 1 | 560 | 3 | 8 | 480 | 4 | 8 |
| Polyester | 0 | 0 | 840 | 2 | 8 | 670 | 0 | 4 |
| Polypropylene | 0 | 0 | 540 | 2 | 5 | 460 | 2 | 1 |

Example 28

Aqueous dispersions of Examples 5, 16, and 18 were padded onto the 4 different upholstery fabrics as listed in Example 27 by padding an amount sufficient to provide the fluorine concentration on the dried carpet as shown in Table 3. The surfactants used were sodium dodecylbenzene sulfonate available as "SUL-FON-ATE" AA-10 (Tennessee Chemical Co., Atlanta, Ga.) for the anionic dispersions of Examples 5 and 18, and N,N,N-trimethyl 1-dodecanaminium chloride (50%) in 70% aqueous isopropanol available as "ARQUAD" 12-50 (Akzo Nobel Chemicals Inc., Chicago, Ill.) for the cationic dispersion of Example 16. The treated fabrics were dried for 5 minutes at 120° C. before being tested for fluorine and oil/water repellency according to Test Methods 2 and 4 respectively as shown in Table 3.

TABLE 3

Fluorine Loadings and Oil and Water Repellency Measurements on Fabrics (Elevated Temperature Drying)

| Fabric Type | Control Repellency Oil/Water | Anionic Ex. 5 Fluorine ppm | Anionic Ex. 5 Repellency Oil | Anionic Ex. 5 Repellency Water | Cationic Ex. 16 Fluorine ppm | Cationic Ex. 16 Repellency Oil | Cationic Ex. 16 Repellency Water | Anionic Ex. 18 Fluorine ppm | Anionic Ex. 18 Repellency Oil | Anionic Ex. 18 Repellency Water |
|---|---|---|---|---|---|---|---|---|---|---|
| Cotton | 0/0 | 1410 | 2 | 4 | 1490 | 3 | 6 | 1980 | 0 | 0 |
| Nylon | 0/1 | 1860 | 1 | 6 | 3980 | 3 | 8 | 1880 | 0 | 3 |
| Polyester | 0/0 | 2240 | 2 | 6 | 1810 | 0 | 6 | 2280 | 0 | 0 |
| Polypropylene | 0/0 | 1330 | 4 | 8 | 1380 | 4 | 8 | 1620 | 0 | 0 |

Example 29

Sandstone blocks (1×2×3 inch, 2.5×5.1×7.6 cm) were dipped for 30 seconds in acetone solutions of fluoropolymers from Examples 5 and 16. Each solution was prepared to have a 1.615% fluorine concentration. A solution of a comparable molar concentration containing 2.16% poly(vinyl chloride) (PVC) was used as a control. The treated sandstone blocks were allowed to dry at ambient temperature over a 24 hour period before being tested for oil/water repellency according to Test Methods 2 and 4 respectively and motor oil staining according to Test Method 3 as shown in Table 4.

TABLE 4

Oil and Water Repellency and Motor Oil Stain Measurements on Sandstone Blocks

| Test | Untreated | PVC Control | Example 5 | Example 16 |
|---|---|---|---|---|
| Oil Repellency | 0 | 0 | 6 | 5 |
| Water Repellency | 0 | 3 | 8 | 8 |
| Motor Oil Stain | Yes | Yes | No | No |

Example 30

Concrete patio blocks (95×95×25 mm) were dipped for 1 minute in acetone solutions of fluoropolymers from Examples 5 and 16. Each solution was prepared to have a 0.8% fluorine concentration. A solution of a comparable molar concentration containing 1.08% poly(vinyl chloride) (PVC) was used as control. The treated concrete blocks were allowed to dry at ambient temperature over a 3-day period. The absorption of water was then determined by immersion of the blocks in water according to the Federal Specification Method SS-W-110C (Test Method 5). The absorption data after various times are shown in Table 5.

TABLE 5

Water Absorption Measurements on Concrete Blocks

| Immersion Period | Untreated | PVC Control | Example 5 | Example 16 |
|---|---|---|---|---|
| after 1 hour | 6.4 | 5.8 | 1.3 | 1.1 |
| after 6 hours | 6.3* | 6.3 | 3.5 | 2.0 |
| after 24 hours | 6.2* | 6.4 | 4.8 | 3.1 |
| after 48 hours | 6.2* | 6.4 | 5.9 | 3.7 |
| after 72 hours | 6.1* | | 6.3 | 4.2 |

*The untreated blocks lose weight during immersion, due to the leaching of inorganic components of the concrete, causing turbidity. This leaching is suppressed in the treated samples.

Example 31

Ponderosa pine wood samples in form of elongated slats were treated by immersion for 30 seconds in acetone solutions of fluoropolymers from Example 5 and 16. Each solution was prepared to have a 0.8% fluorine concentration. A solution of a comparable molar concentration containing 1.08% poly(vinyl chloride) (PVC) was used as control. Treatment, conditioning and testing was carried out according to ASTM Test Method D 4446-84 (Test Method 6) using for each polymer 5 treated and 5 untreated specimens. The difference between the swelling after exposure to water of each treated specimen and the swelling of its matching untreated control specimen was divided by the swelling of the untreated control specimen and multiplied by 100. A minimum water-repellent efficiency of 60% is required to pass this test method. Both fluoropolymers passed the test as shown in Table 6.

TABLE 6

Water Repellent Efficiency Measurements on Pine Wood Samples. Average Water-Repellent Efficiency as %

| Polymer Control PVC | Fluoropolymer Example 5 | Fluoropolymer Example 16 |
|---|---|---|
| 2.0 | 64.4 | 63.7 |

Example 32

Poly(vinyl chloride) powder (50 g) is mixed with the fluorothiol-modified poly(vinyl chloride) of Example 16 (2.5 g) and is melt blended at about 175° C. in a single screw extruder. The resulting chips are pressed at 170° C. to a film which exhibits improved repellency when compared to a control sample.

What is claimed is:

1. A polymer having pendant fluoroalkylsulfide groups and pendant alkylsulfide groups comprising the reaction product of:

a) a thiol of Formula I

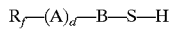   I wherein:

$R_f$ is a fully fluorinated straight or branched aliphatic radical of about 3 to about 14 carbon atoms optionally interrupted by at least one ether oxygen atom;

A is a divalent radical selected from the group consisting of —$SO_2N(R)$—, —$CON(R)$—, —S—, and —$SO_2$— wherein R is H or an alkyl radical of 1 to about 6 carbon atoms;

d is 0 or 1; and

B is a divalent linear hydrocarbon radical —$C_nH_{2n}$— wherein n is from about 2 to about 12, b) a thiol of Formula II

X—R'—S—H   II wherein:

X is H, OH, —COOM, or —$SO_3M$;

M is H, Na, K, or $NH_4$;

R' is a difunctional alkyl group selected from the group consisting of —$(CH_2)_m$—, —CH(COOH)—, and —$CH_2$—CH(COOH)—; a difunctional aromatic group —$C_6H_4$—; or a difunctional heterocyclic group —$C_5NH_3$—; and m is 1 to 18; and c) a polymer containing chlorine or bromine substituted on carbon, or a chlorinated or brominated paraffin of a maximum of 12 carbons and of a molecular weight of at least 250.

2. A polymer having pendant fluoroalkylsulfide groups comprising the reaction product of:

a) a thiol of Formula I

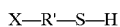   I wherein:

$R_f$ is a fully fluorinated straight or branched aliphatic radical of about 3 to about 14 carbon atoms optionally interrupted by at least one ether oxygen atom;

A is a divalent radical selected from the group consisting of —$SO_2N(R)$—, —$CON(R)$—, —S—, and —$SO_2$— wherein R is H or an alkyl radical of 1 to about 6 carbon atoms;

d is 0 or 1; and

B is a divalent linear hydrocarbon radical —$C_nH_{2n}$— wherein n is from about 2 to about 12, and b) a polymer containing chlorine or bromine substituted on carbon, or a chlorinated or brominated paraffin of a maximum of 12 carbons and of a molecular weight of at least 250.

3. The polymer of claim 2 further reacted with a thiol of formula II

X—R'—S—H   II wherein:

X is H, OH, —COOM, or —$SO_3M$;

M is H, Na, K, or $NH_4$;

R' is a difunctional alkyl group selected from the group consisting of —$(CH_2)_m$—, —CH(COOH)—, and —$CH_2$—CH(COOH)—; a difunctional aromatic group —$C_6H_4$—; or a difunctional heterocyclic group —$C_5NH_3$—; and m is 1 to 18;

yielding a polymer having pendant fluoroalkylsulfide groups and pendant alkylsulfide groups.

4. The polymer of claim 1, 2 or 3 wherein the polymer having chlorine or bromine substituted on carbon is selected from the group consisting of a homopolymer or copolymer of chlorine or bromine containing alkylene or arylene monomers, epichlorohydrine, chlorinated or brominated alkyl epoxides, chlorinated or brominated alkyl oxetanes, chlorinated or brominated alkyl siloxanes, chlorinated or brominated polyesters, and chlorinated or brominated polyolefins.

5. The polymer of claim 4 wherein the polymer having chlorine substituted on carbon is polyvinylchloride or poly (epichlorohydrin).

6. The polymer of claim 1, 2 or 3 wherein the pendant fluoroalkylsulfide is of the formula $F(CF_2)_p(CH_2)_nS$— wherein p is 3 to 18 and n is 2, or a mixture thereof.

7. The polymer of claim 1 or 3 wherein the pendant alkylsulfide is selected from the group consisting of octadecyl mercaptan, thiophenol, 2-mercapto pyridine, 2-mercaptoethanol, mercaptoacetic acid and mercaptosuccinic acid, or a mixture thereof.

8. A process for the preparation of a polymer having pendant fluoroalkylsulfide groups and pendant alkylsulfide groups comprising reacting a polymer having chlorine or bromine substituted on carbon, or a chlorinated or brominated paraffin of a maximum of 12 carbons and of a molecular weight of at least 250 with:

a) a thiol of Formula I

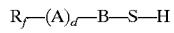   I wherein:

$R_f$ is a fully fluorinated straight or branched aliphatic radical of about 3 to about 14 carbon atoms optionally interrupted by at least one ether oxygen atom;

A is a divalent radical selected from the group consisting of —$SO_2N(R)$—, —$CON(R)$—, —S—, and —$SO_2$— wherein R is H or an alkyl radical of 1 to about 6 carbon atoms;

d is 0 or 1; and

B is a divalent linear hydrocarbon radical —$C_nH_{2n}$— wherein n is from about 2 to about 12, and b) a thiol of Formula II

X—R'—S—H   II wherein:

X is H, OH, —COOM, or —$SO_3M$;

M is H, Na, K, or $NH_4$;

R' is a difunctional alkyl group selected from the group consisting of —$(CH_2)_m$—, —CH(COOH)—, and —$CH_2$—CH(COOH)—; a difunctional aromatic group —$C_6H_4$—; or a difunctional heterocyclic group —$C_5NH_3$—; and m is 1 to 18;

yielding a polymer having pendant fluoroalkylsulfide groups and pendant alkylthio groups.

9. A process for the preparation of a polymer having pendant fluoroalkylsulfide groups comprising reacting a polymer having chlorine or bromine substituted on carbon, or a chlorinated or brominated paraffin of a maximum of 12 carbons and of a molecular weight of at least 250 with a thiol of Formula I $$R_f\text{—}(A)_d\text{—}B\text{—}S\text{—}H \qquad I$$

$R_f$ is a fully fluorinated straight or branched aliphatic radical of about 3 to about 14 carbon atoms optionally interrupted by at least one ether oxygen atom;

A is a divalent radical selected from the group consisting of —SO$_2$N(R)—, —CON(R)—, —S—, and —SO$_2$— wherein R is H or an alkyl radical of 1 to about 6 carbon atoms;

d is 0 or 1; and

B is a divalent linear hydrocarbon radical —C$_n$H$_{2n}$— wherein n is from about 2 to about 12;

in the presence of a base to yield a polymer having pendant fluoroalkylsulfide groups.

10. The process of claim 8 or 9 conducted in the presence of a phase transfer catalyst.

11. The process of claim 10 wherein the catalyst is selected from the group consisting of benzyltriethylammonium salts and tetrabutylammonium salts.

12. A method of improving the oil and water repellency or antisoil property of a polymer having chlorine or bromine substituted on carbon, or of a chlorinated or brominated paraffin of a maximum of 12 carbons and of a molecular weight of at least 250 comprising replacing at least 5 mole percent of the chlorine or bromine with pendant fluoroalkylsulfide groups of formula:

$$R_f\text{—}(A)_d\text{—}B\text{—}S\text{—}$$

wherein:

$R_f$ is a fully fluorinated straight or branched aliphatic radical of about 3 to about 14 carbon atoms optionally interrupted by at least one ether oxygen atom;

A is a divalent radical selected from the group consisting of —SO$_2$N(R)—, —CON(R)—, —S—, and —SO$_2$— wherein R is H or an alkyl radical of 1 to about 6 carbon atoms;

d is 0 or 1; and

B is a divalent linear hydrocarbon radical —C$_n$H$_{2n}$— wherein n is from about 2 to about 12.

13. A method of improving the oil and water repellency or antisoil property of a substrate comprising application to a surface of the substrate an effective amount of a solution or emulsion of the polymer of claim 1, 2 or 3 and drying the substrate.

14. A method of improving the oil and water repellency or antisoil property of a nonfluorinated polymer or paraffin by melt blending or powder blending said polymer or paraffin with a polymer having pendant fluoroalkylsulfide groups of claim 1, 2 or 3.

15. The polymer of claim 1 or 2 wherein A is selected from the group consisting of —SO$_2$N(R)—, —S—, and —SO$_2$—.

16. The polymer of claim 1 or 3 wherein X is OH, COOM, or SO$_3$M.

* * * * *